Oct. 6, 1959    J. B. BREAZEALE ET AL    2,907,211
GRAVITY METER

Filed Sept. 6, 1957    2 Sheets-Sheet 1

INVENTORS
JOHN B. BREAZEALE
EDWARD N. DACUS
CHARLES G. McILWRAITH

BY Harmon & Pierce

ATTORNEYS

Oct. 6, 1959   J. B. BREAZEALE ET AL   2,907,211
GRAVITY METER
Filed Sept. 6, 1957   2 Sheets-Sheet 2

INVENTORS
JOHN B. BREAZEALE
EDWARD N. DACUS
CHARLES G. McILWRAITH

BY *Harmon & Pierce*

ATTORNEYS

United States Patent Office 2,907,211
Patented Oct. 6, 1959

2,907,211

GRAVITY METER

John B. Breazeale, Solana Beach, and Charles G. McIlwraith and Edward N. Dacus, Rancho Santa Fe, Calif., assignors to Bill Jack Scientific Instrument Co., Solana Beach, Calif., a corporation of California Application September 6, 1957, Serial No. 682,406

17 Claims. (Cl. 73—382)

This invention relates generally to gravity meters and more particularly to improvements in such meters over similar instruments, such as disclosed by United States Patents: 2,574,395 and 2,681,574, issued to W. R. Jack et al.

The primary object of this invention is to provide a gravity meter of high sensitivity to the changing effects of gravitational forces in various locations.

A more specific object of this invention is to provide a gravity meter in which the gravity reactive spindle element is virtually unaffected by friction.

Another object of this invention is to provide a gravity meter in which the effect of gravity on its gravity active spindle element is initially and effectively cancelled so that minute changes in the gravity effect on the element in various locations may be readily detected.

A further object of this invention is to provide a gravity meter in which the gravity reactive spindle element is magnetically supported within the instrument to preclude the use of any other support means which would, of necessity, involve the introduction of friction forces.

Still another object of this invention is to provide a gravity meter including a spindle element totally supported by magnetic forces wherein changing gravity effects on the element are countered by a motive system applying torque to the element while indicating the magnitude of such applied torque on a suitable calibrated meter.

Another specific object of this invention is to provide a gravity meter in which the gravity reactive spindle element is totally supported by a magnetic system, and while in the supported position is damped during oscillations by other magnetic elements.

With the foregoing and other objects in view the invention resides in the following specification and appended claims certain embodiments and details of construction of which are illustrated in the accompanying drawings in which:

Figure 1:
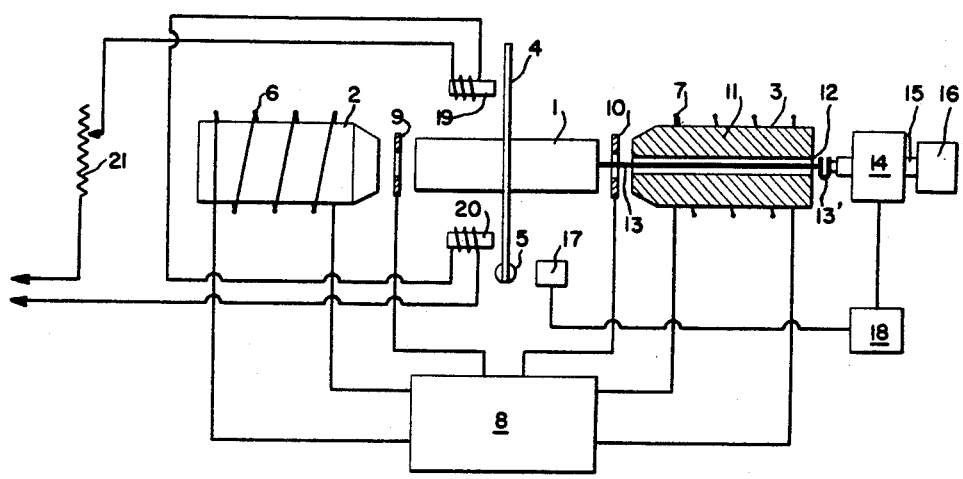
Figure 1 is a schematic diagram of the gravity meter comprising the invention.
Figure 2:
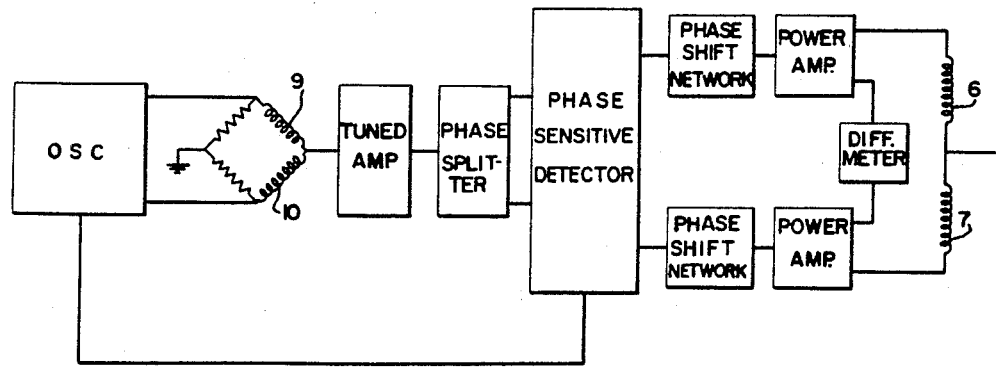
Figure 2 is a block diagram of the support circuit for the gravity reactive spindle element.

Referring more particularly to Figure 1, a ferro-magnetic spindle 1 is illustrated as being totally supported in space by electromagnets 2 and 3. The spindle 1 carries a disk 4 of non-magnetic conducting material about its midpoint. The disk 4 may take other forms such as a cross bar. At one position adjacent to the periphery of the disk 4 is a small mass 5, the purpose of which is to unbalance the disk 4 about the axis of the spindle 1. The spindle axis is coincident with the common axis of the electromagnets 2 and 3 so that the spindle may oscillate or rotate about its axis between the magnets without being encumbered by friction factors as would be the case were standard bearings used for support. Each electromagnet 2 and 3 is provided with a coil 6 and 7, respectively, which is connected to the support circuit 8. The support circuit 8 is illustrated in block form in Figure 2 and is more fully described in our application Serial No. 643,138, filed February 28, 1957.

Positioned in the airgap between the ends of the spindle 1 and the adjacent ends of electromagnets 2 and 3 are position sensing coils 9 and 10 which are likewise connected to the support circuit 8. The coils 9 and 10 are utilized to sense any axial movement of the spindle 1 in order to maintain the spindle centrally positioned between the magnets 2 and 3. Thus, if the spindle 1 should shift to the left in Figure 1, a differential electrical signal will be created between coils 9 and 10. This signal will pass through the support circuit 8 to control the currents in coils 6 and 7 of magnets 2 and 3 in such a manner as to cause the spindle 1 to be moved to the right in Figure 1 until its neutral position is re-established.

The core 11 of magnet 3 is provided with an axial bore 12 through which extends a quartz fibre 13. A resilient quartz bow 13' is provided between the torquing shaft of the motor 14 and the quartz fibre 13 in order to prevent breakage of fibre 13 due to axial shocks. The fibre 13 also extends through coil 10 and is secured to the end of spindle 1 by any suitable means. The other end of the fibre 13 is secured to a reversible torque motor 14. Secured to the shaft 15 of motor 14 is a revolution counter 16. The purpose of the counter 16 is to count the number of degrees of rotation of the torque motor shaft 15. The means to indicate the direction and magnitude of motor shaft displacement as a measure of the changing gravity effect may obviously take other forms.

Control signals for the motor 14 are derived from error signals created by a sensing unit 17 and amplified by a suitable amplifier 18. When the motor receives such a signal it will rotate in the proper direction to twist the quartz fibre so as to apply a corrective torque to the spindle 1, thereby returning the spindle to a pre-assigned neutral position.

Positioned adjacent the disk 14 are eddy current dampers 19 and 20. These dampers are illustrated as being electromagnets, but they may be permanent magnets or a combination of permanent magnets and electromagnets. In either form the dampers provide damping torques proportional to the disk velocity. As illustrated, the dampers 19 and 20 are series connected and a variable resistance 21 is provided as a means of adjusting the damping effect on the disk 4. The dampers 19 and 20 are connected to a suitable source of supply (not shown).

The spindle 1, disk 4, the fibre 13, and the various coils and magnets, together with the sensing unit 17, are housed in a heat insulated vacuum enclosure (not shown). The purpose of the enclosure is to prevent the transfer of energy by Brownian motion, or by convection currents to the disk. When housed within such an enclosure, a magnetic drive coupling may be utilized on opposite sides of the enclosure wall so that the motor may drive the fibre.

In operation of the gravity meter, as thus far described, the common axis of the magnets 2 and 3, the spindle 1, the disk 4, the fibre 13, and the motor 14, is made horizontal. The movement sensing unit 17 is positioned so that the pre-assigned rotational null position of the disk and spindle is one in which the radial line running from the axis of the spindle 1 through the center of the mass 5 attached to the disk 4 is horizontal; that is, the null position of the disk is 90 degrees from the position it would take under the action of gravity alone. The action of gravity on the unbalanced disk 4 in this position applies a torque to the fibre 13 of a magnitude MgR where M is the mass 5 at a distance R from the axis of rotation, and g is the gravitational acceleration constant. This torque causes disk 4 and spindle 1 to begin to rotate, but as soon as this happens, the amplified error signal from sensing unit 17 causes the torque motor 14 to run, acting on the fibre to supply a corrective torque thereto and hence the disk is maintained in the null position. The torque applied to the spindle by the fibre is given by the formula: $T = K\theta$, where K is the torque constant of the fibre and is known, and $\theta$ is the total angle through which the fibre has been twisted. The ultimate steady state condition of the system is one in which the fibre has been twisted through such an angle that the torque it applies to the spindle and disk is equal and opposite to that applied by gravity. Thus the condition may be determined by the formula:

$$g = \frac{K\theta}{MR}$$

where $g$ is gravity and K, M, and R are constants as discussed above and $\theta$ can be determined from the degree counter 16 attached to the motor 14. It should now be obvious that the varying, gravitational effect in different locations on the surface of the earth, under water, or in the stratosphere, may be precisely determined by this instrument. Obviously a lessening gravity effect will be sensed by unit 17 to decrease the torque on fibre 13 through motor 14 to keep the disk 4 at the neutral position.

Figure 3:
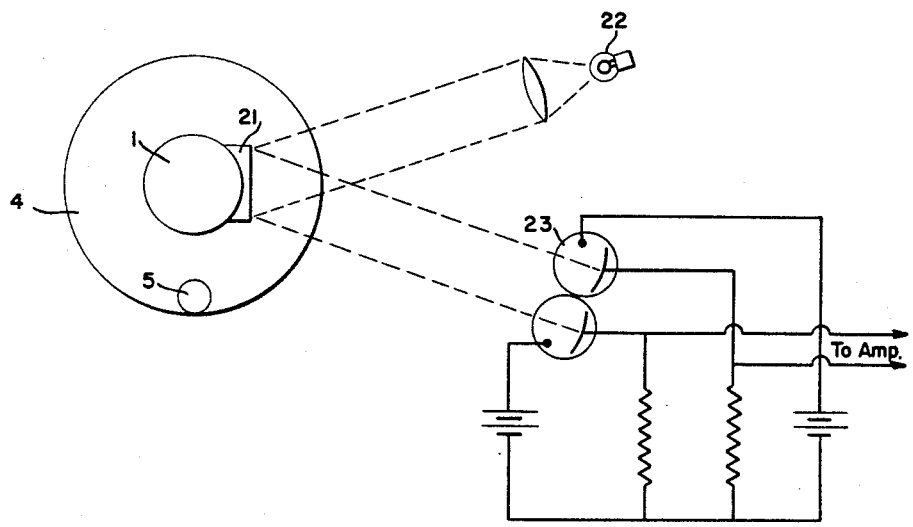
Figure 3 is a schematic diagram of a photoelectric sensing circuit which may be utilized in detecting movement of the gravity reactive spindle according to one form of the invention.
Figure 4:
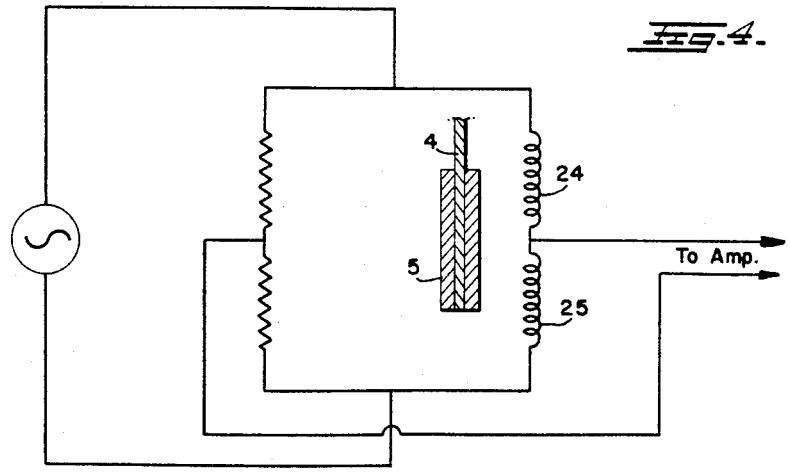
Figure 4 is a schematic diagram of a magnetic sensing circuit which may be utilized in detecting movement of the gravity reactive spindle according to another form of the invention.

The sensing unit 17 may be photoelectric or electromagnetic in nature. Figure 3 illustrates a suitable photoelectric form. Figure 4 illustrates a suitable electromagnetic form. In Figure 3 a plane mirror 21 is secured to the spindle 1. Light from a light source 22 is reflected onto a dual photo-cell 23 (or a pair of photocells) which are connected to respond differentially. If the light reflected from the mirror falls equally on the photocells, there is a null output and no signal is fed to the amplifier. If then the spindle and the attached mirror rotate under a varying gravity effect, more light will fall on one photocell than on the other, and the difference in output of the cells will be fed to the amplifier. This error or difference voltage will have a polarity determined by which cell receives the most light, and, therefore, determined by which way the spindle and attached mirror have rotated.

The sensing circuit of Figure 4 includes a bridge circuit including in two arms thereof coils 24 and 25. With the mass 5 made of magnetic material, a differential transformer effect will be achieved upon angular movement of disk 4, which tends to move mass 5 from an electrical neutral position relative to coils 24 and 25. Upon movement of the mass an error signal will be created, amplified, and opposed by the torque motor 14 and fibre 13, as previously described.

It should be obvious to one skilled in the art that other sensing unit forms than those illustrated in Figures 3 and 4 may be utilized to detect angular movement of the disk 4 under varying gravity effects.

This gravity meter has a number of advantages over similar units in the prior art, such as those of W. R. Jack et al., United States Patents: 2,574,395 and 2,681,574.

In the present invention the quartz fibre is utilized for torque applying purposes only. It performs no supporting function and hence a smaller fibre may be used. By having the spindle totally magnetically supported, the sensitivity and accuracy of the instrument is increased. Other advantages apparent are an increase in range and natural period, a decrease in response to transient accelerations, and the fibre will withstand greater axial accelerations without breaking.

It is, therefore, obvious that this invention provides a new and improved gravity meter of great sensitivity to minute changing gravitational effects, and it is intended that, that scope of the invention be determined by the appended claims and not necessarily by the details of construction theretofore described in the specification and illustrated in the drawings.

We claim:

1. A gravity meter comprising a ferromagnetic spindle, a disk of non-magnetic, conducting material mounted on said spindle, said disk being provided with an unbalancing mass attached to its periphery, electromagnetic means to support said spindle in space free to rotate substantially without friction, said electromagnetic means constituting the sole support for the spindle, means attached to said spindle to apply torque thereto, motor means to drive said torque applying means, sensing means responsive to angular movements of said disk about its axis due to changing gravity effects on the mass to energize said motor to apply corrective torque to the disk spindle to maintain a neutral balance, and means to indicate the direction and the magnitude of the applied torque.

2. A gravity meter comprising a ferromagnetic spindle, a disk of non-magnetic conducting material mounted on said spindle, said disk being provided with an unbalancing mass attached to its periphery, electromagnetic means to support said spindle in space free to rotate substantially without friction, said electromagnetic means constituting the sole support for the spindle, a quartz fibre attached to one end of said spindle to apply torque thereto, motor means to drive said torque applying fibre, sensing means responsive to angular movements of said disk about its axis due to changing gravity effects on the mass to energize said motor to apply corrective torque to the disk spindle to maintain a neutral balance, and means to indicate the magnitude and the direction of the applied torque.

3. A gravity meter comprising a ferromagnetic spindle, a disk mounted on said spindle, said disk being provided with an unbalancing mass attached to its periphery, electromagnetic means to support said spindle in space free to rotate substantially without friction, said electromagnetic means constituting the sole support for the spindle, means attached to said spindle to apply torque thereto, motor means to drive said torque applying means, sensing means responsive to angular movements of said disk about its axis due to changing gravity effects on the mass to energize said motor to apply corrective torque to the disk spindle to maintain a neutral balance, and means to indicate the magnitude and the direction of the applied torque.

4. A gravity meter comprising a ferromagnetic spindle, a disk mounted on said spindle, said disk being provided with an unbalancing mass attached to its periphery, electromagnetic means to support said spindle in space free to rotate substantially without friction, said electromagnetic means constituting the sole support for the spindle, fibre means attached to said spindle to apply torque thereto, motor means to drive said torque applying means, sensing means responsive to angular movements of said disk about its axis due to changing gravity effects on the mass to energize said motor to apply corrective torque to the disk spindle to maintain a neutral balance, and means to indicate the magnitude and the direction of the applied torque.

5. A gravity meter comprising a ferromagnetic spindle, electromagnetic means to support said spindle in space free to rotate substantially without friction, said electromagnetic means constituting the sole support for the spindle, first means attached to the spindle to apply torque thereto, motor means to drive said first torque applying means, second means secured to said spindle to apply torque of a magnitude dependent on gravitational forces acting thereon, sensing means responsive to angular movement of said second torque applying means to energize said motor in a manner to apply corrective torque to the spindle to maintain a neutral balance, and means to indicate the magnitude and the direction of the applied corrective torque.

6. A gravity meter comprising a ferromagnetic spindle, electromagnetic means to support said spindle in space free to rotate substantially without friction, said electromagnetic means constituting the sole support for the spindle, fibre means attached to said spindle to apply torque thereto, motor means to drive said fibre means, means secured to said spindle to impart torque of a magnitude dependent on gravitational forces acting thereon, sensing means responsive to changes in position of said spindle secured means resulting from variations in gravitational forces acting thereon to energize said motor to apply corrective torque through the fibre means to the spindle to maintain a neutral balance, and means to indicate the magnitude and the direction of the applied corrective torque.

7. A gravity meter comprising a ferromagnetic spindle, a disk mounted on said spindle, said disk being provided with an unbalancing mass attached to its periphery, electromagnetic means, each including a core and an energizing winding, disposed adjacent to each end of the spindle to support said spindle in space free to rotate substantially without friction, one of said electromagnetic means cores being provided with an axial passage, a fibre attached to said spindle and extending through said axial passage to apply torque to the spindle, motor means to drive said fibre torque applying means, sensing means responsive to angular movement of said disk about its axis due to varying gravity effects on the mass to energize said motor to apply corrective torque to the disk spindle through said fibre to maintain a neutral balance, and means to indicate the magnitude and the direction of the applied torque.

8. A gravity meter comprising a ferromagnetic spindle, a disk mounted on said spindle, said disk being provided with an unbalancing mass attached to its periphery, electromagnetic means, each including a core and an energizing winding, disposed adjacent to each end of the spindle to support said spindle in space free to rotate substantially without friction, one of said electromagnetic means cores being provided with an axial passage, a fibre attached to said spindle and extending through said axial passage to apply torque to the spindle, motor means to drive said fibre torque applying means, sensing means positioned adjacent said disk to detect the effect of changing gravitational forces acting on the disk and to energize said motor accordingly to apply corrective torque to the disk spindle through said fibre to maintain a neutral balance of the disk, and means to indicate the magnitude and the direction of the applied torque.

9. A gravity meter comprising a ferromagnetic spindle, electromagnets to support and position said spindle in space free to rotate substantially without friction, said electromagnetic means constituting the sole support for the spindle, circuit means to energize said electromagnets to maintain said spindle in a neutral axial position, fibre means attached to said spindle along its axis to apply torque thereto, motor means to drive said fibre means, means secured to said spindle to impart torque thereto of a magnitude dependent on gravitational forces acting thereon, sensing means responsive to changes in angular position of said spindle secured means resulting from variations in gravitational forces acting thereon to generate an error signal, amplifier means electrically connected in circuit between the sensing means and the motor means to cause said motor to rotate in the proper direction as determined by said error signal to apply corrective torque through said fibre means to the spindle to maintain its neutral balance position, and means to indicate the direction and the magnitude of the applied corrective torque.

10. The invention according to claim 9 in which said sensing means is electromagnetic in character.

11. The invention according to claim 9 in which said sensing means is photo-electric in character.

12. A gravity meter comprising a ferromagnetic spindle, electromagnets to support and position said spindle in space free to rotate substantially without friction, said electromagnetic means constituting the sole support for the spindle, circuit means to energize said electromagnets to maintain said spindle in a neutral position, fibre means attached to said spindle along its axis to apply torque thereto, motor means to drive said fibre means, an inherently unbalanced disk secured to said spindle to impart a torque thereto of a magnitude dependent on gravitational forces acting thereon, sensing means responsive to changes in angular position of said disk resulting from variations in gravitational forces acting thereon to generate an error signal, amplifier means electrically connected in circuit between the sensing means and the motor means to cause said motor to rotate in the proper direction as determined by said error signal to apply corrective torque through said fibre means to the spindle to maintain its neutral balance position, and means to indicate the magnitude and the direction of the applied corrective torque.

13. The invention according to claim 12 in which the sensing means is electromagnetic in character.

14. The invention according to claim 12 in which the sensing means is photo-electric in character.

15. A gravity meter comprising a ferromagnetic spindle, electromagnets to support and position said spindle in space free to rotate substantially without friction, said electromagnetic means constituting the sole support for the spindle, circuit means to energize said electromagnets to maintain said spindle in a neutral position, fibre means attached to said spindle along its axis to apply torque thereto, motor means to drive said fib.. means, means secured to said spindle to impart torque thereto of a magnitude dependent on gravitational forces acting thereon, damping means to stabilize angular movements of said spindle secured means, sensing means responsive to changes in position of said spindle secured means resulting from variations in gravitational forces acting thereon to generate an error signal, amplifier means electrically connected in circuit between the sensing means and the motor means to cause said motor to rotate in the proper direction as determined by said error signal to apply corrective torque through said fibre means to the spindle to maintain its neutral balance position, and means to indicate the direction and the magnitude of the applied corrective torque.

16. A gravity meter comprising a ferromagnetic spindle, electromagnets to support and position said spindle in space free to rotate substantially without friction, said electromagnetic means constituting the sole support for the spindle, circuit means to energize said electromagnets to maintain said spindle in a neutral position, fibre means attached to said spindle along its axis to apply torque thereto, motor means to drive said fibre means, an inherently unbalanced disk secured to said spindle to impart a torque thereto of a magnitude dependent on gravitational forces acting thereon, sensing means responsive to changes in angular position of said disk resulting from variations in gravitational forces acting thereon to generate an error signal, amplifier means electrically connected in circuit between the sensing means and the motor means to cause said motor to rotate in the proper direction as determined by said error signal to apply corrective torque through said fibre means to the spindle to maintain its neutral balance position, damping means positioned adjacent said disk to stabilize angular movements of said disk, and means to indicate the magnitude and the direction of the applied corrective torque.

17. A gravity meter comprising a ferromagnetic spindle, a disk mounted on said spindle, said disk being inherently unbalanced relative to the spindle, electromagnets to support and position said spindle in space free to rotate substantially without friction, means to energize said electromagnets to maintain said spindle in a neutral axial position between said electromagnets, means attached to said spindle to apply torque thereto, motor means to drive said torque applying means, sensing means responsive to angular movements of said disk about its axis due to varying gravity effects thereon to energize said motor to apply corrective torque to the spindle to maintain the neutral position, damping means to stabilize movements of said disk, and means to indicate the direction and the magnitude of the applied torque.

References Cited in the file of this patent

UNITED STATES PATENTS

| | | |
|---|---|---|
| 2,136,219 | Scherbatskoy | Nov. 8, 1938 |
| 2,660,062 | Frowe | Nov. 24, 1953 |
| 2,675,222 | Clark | Apr. 13, 1954 |
| 2,681,574 | Jack et al. | June 22, 1954 |
| 2,694,566 | Wolter | Nov. 16, 1954 |